United States Patent [19]
Arnaud et al.

[11] Patent Number: 5,255,340
[45] Date of Patent: Oct. 19, 1993

[54] METHOD FOR DETECTING VOICE PRESENCE ON A COMMUNICATION LINE

[75] Inventors: Charles Arnaud, Villeneuve-Loubet; Michele Rosso, Saint-Jeannet, both of France

[73] Assignee: International Business Machines Corporation, Armonk, N.Y.

[21] Appl. No.: 927,049

[22] Filed: Aug. 10, 1992

[30] Foreign Application Priority Data

Oct. 25, 1991 [EP] European Pat. Off. ............ 91480162

[51] Int. Cl.$^5$ ............................................. G10L 5/00
[52] U.S. Cl. ........................................ 395/2; 379/351; 379/372; 364/517
[58] Field of Search ................. 395/2; 379/372, 351; 364/517; 381/29-51

[56] References Cited

U.S. PATENT DOCUMENTS

| | | |
|---|---|---|
| 4,028,496 | 6/1977 | LaMarche et al. |
| 4,672,669 | 6/1987 | DesBlache ............................ 395/2 |
| 4,742,537 | 5/1988 | Jesurum ............................... 379/351 |
| 4,979,214 | 12/1990 | Hamilton ................................ 395/2 |
| 4,982,341 | 1/1991 | Laurent ............................... 364/517 |
| 5,023,906 | 6/1991 | Novas .................................. 379/372 |

FOREIGN PATENT DOCUMENTS 0127718 12/1984 European Pat. Off. .
0392412 10/1990 European Pat. Off. .
2213623 8/1989 United Kingdom .

Primary Examiner—Michael R. Fleming
Assistant Examiner—C. Knoll
Attorney, Agent, or Firm—Edward H. Duffield

[57] ABSTRACT

Method and apparatus allows accurate detection of voice presence on a digitized communication line even in the presence of tone signals. The method includes analyzing digitized communication input signals by current blocks of 20ms, to define the stationary or non stationary state of any current block. Then an analysis on the states of the M last 20ms blocks allows the final decision on voice presence.

4 Claims, 4 Drawing Sheets

METHOD FOR DETECTING VOICE PRESENCE ON A COMMUNICATION LINE

FIELD OF THE INVENTION

The present invention relates to telecommunications in general, and more particularly to a method for detecting voice presence on a communication line.

BACKGROUND – PRIOR ART

The ability to detect when a called-party answers the telephone is a requirement for many applications and services that are now available throughout telephone networks, such as automatic voice information, voice messaging, telemarketing, etc . . . If the beginning and the end of called-party's introductory message after hang-up are accurately detected, efficiency in the delivered message will be optimized. Such a detection however is technically difficult to achieve, and it is currently estimated that inaccurate answer detection still costs telephone carriers and users a huge amount of money every year.

U.S. Pat. No. 4,672,669 filed on May 31, 1984, describes a Voice Activity Detector featuring a determination algorithm comprising two steps: checking the received signal energy versus an adaptive threshold, and testing the rate of change of spectral parameters (autocorrelation coefficients) for a number of consecutive 20ms sequences of the received signal versus a second fixed threshold.

The Detector was designed to take advantage of the half duplex effect of telephone conversation, and interpolate additional talkers up to twice the overall channel capacity (multiple telephone channels application). It was then able to detect even low-level "speech" segments in high-level uncorrelated or correlated background noise, but not in the presence of tones, including call progress tones (Detector designed for already established communications).

To detect voice on a communication line, even in the case of tones presence, it can still be considered to use spectral parameters thru a number of consecutive 20ms sequences, but it might happen that variations of these autocorrelation coefficients for some tone signals (including ring-back, SIT tones, . . .), due to the difference between the tone period and the 20ms computation window length, are such that the second threshold is difficult to establish, if not impossible. Moreover, in case of voiced speech (speech 'sounding' like a tone) the method implemented in the Voice Activity Detector appears to not be sensitive enough.

OBJECTS OF THE INVENTION

It is therefore an object of the present invention to provide a method for accurately detecting beginning and end of voice presence on a digitized communication line, even in the presence of tone signals.

BRIEF SUMMARY OF INVENTION

The invention includes a method also based on the computing of spectral parameters, but with more sensitive capabilities, comprising more decision steps that make it suitable for detection of voice presence throughout the whole communication time, with all known types of signalling tones, in all cases of received signals, including when the ring-back tone is not received at the calling party (case of fast hang-up). The method also allows detection of the end of the called-party's answer. Computation power and memory requirements are very low. Voice presence is detected in less than 200ms. The invention has been tested versus numerous typical communication and telephone signals as call progress tones (dial, busy, reorder, ring-back, vacant, waiting, intercept), more than 100 voice files combined with silence, with and without noise conditions, . . .

The method includes analyzing digitized communication input signal by blocks of 20ms, and defining the stationary or non-stationary state of any current block. Then an analysis on the states of M last 20ms blocks allows to give the final decision on voice presence or not.

The invention specifically includes a method for detecting voice presence on a communication line, in a system where communication data are incoming in the form of a series of successive binary samples, of which N are stored so as to successively make up an input block of samples, said method comprising, after each block input, the steps of:

determining the stationary or non stationary state of the current block, and deciding voice presence in the incoming communication data, if more than M3 non stationary states have been determined within the last M input blocks including the current block, and deciding end of voice presence if no non stationary states have been determined within the last M input blocks including the current block.

The invention will be better understood from the following detailed description read in conjunction with the following schematics:

BRIEF DESCRIPTION OF DRAWINGS

FIG. 4 shows an example of parameter evolution with the method according to the present invention.

DETAILED DESCRIPTION OF PREFERRED EMBODIMENT OF INVENTION

Figure 1:
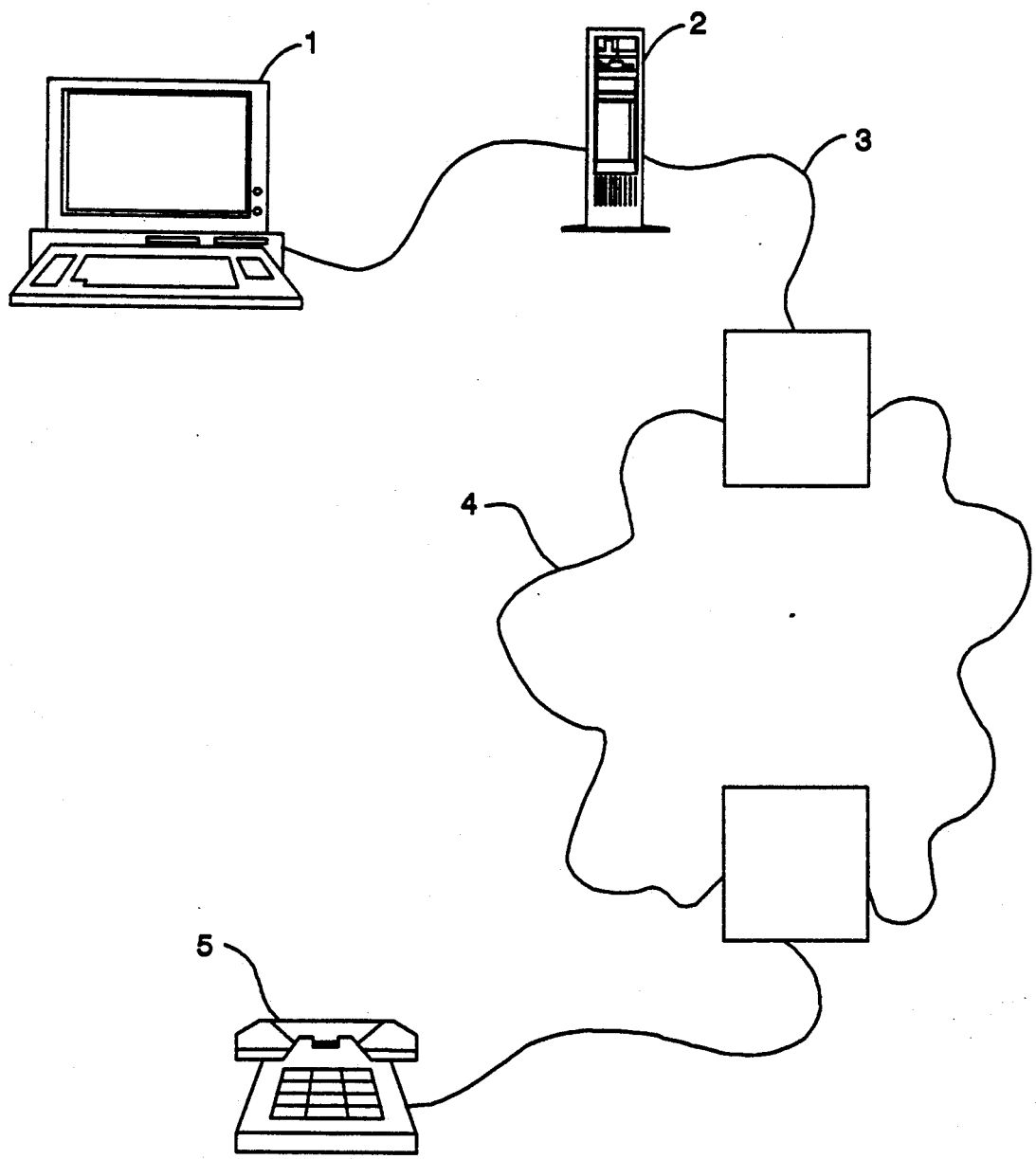
FIG. 1 shows an example of an application of the method according to the invention.

FIG. 1 shows an example of implementation for the method according to the invention. A terminal 1 allows an operator to take control over a computer system 2. The computer system includes interfacing functions with link 3, which is a digital link carrying several digitized communications. Such communications are organized on the link under a format well-known by the man skilled in the art as T1, CEPT or ISDN (Basic or Primary Rate). The link is provided by a telephone company that operates network 4. A private phone 5 is for example connected to the same network.

The computer system is capable of running an application such as automatic voice messaging, which requires handling of the call progress up to the called-party 5, delivery of a recorded message, and handling of proper end for the call. The present invention teaches, before delivery of the recorded message, the accurate detection of hang-up and end of introductory message by the called-party ('Mr. Smith speaking . . . '), so that, for example, the recorded message is not partially left unheard.

Figure 2:
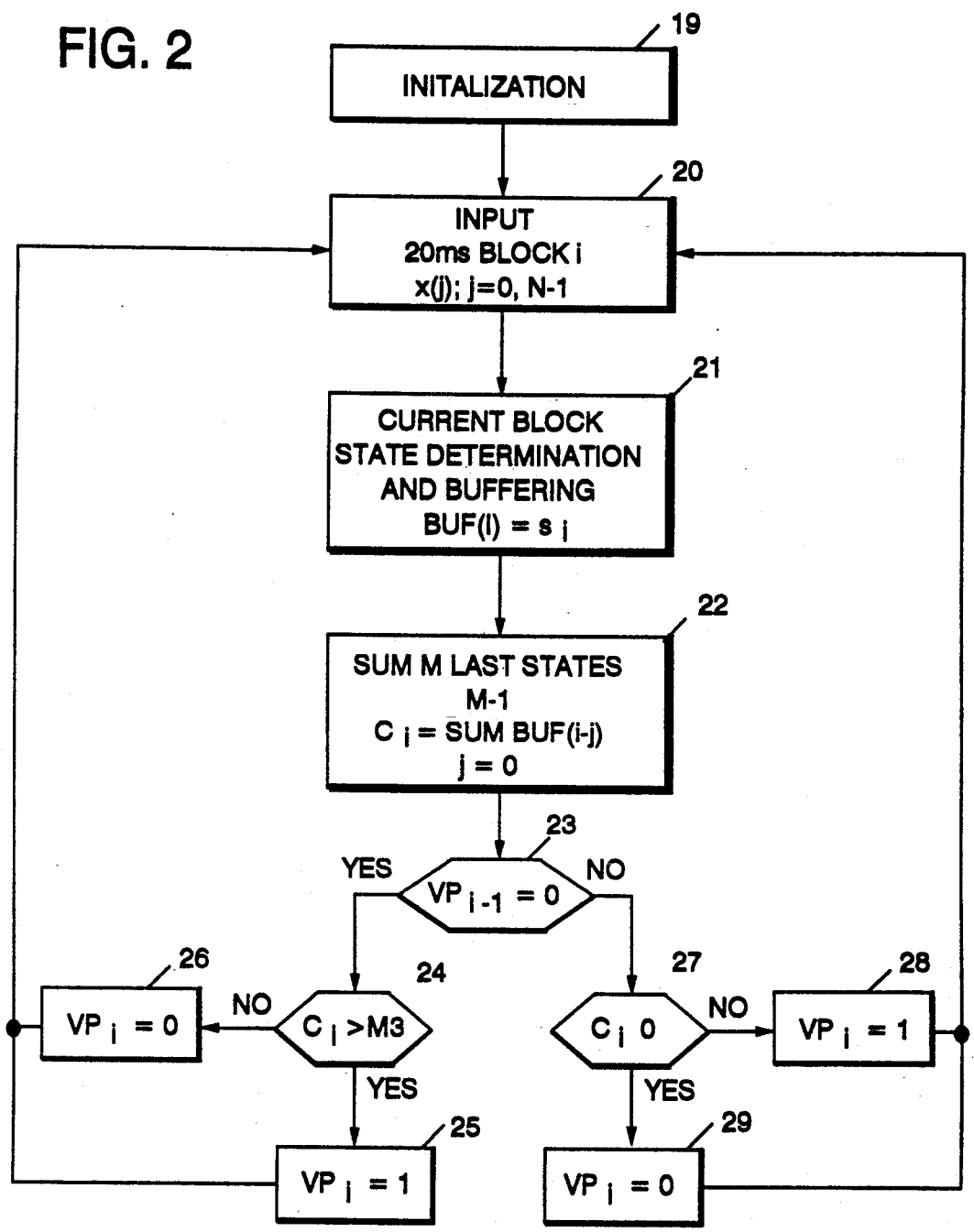
FIG. 2 shows the sequence of steps in the method according to the present invention.

FIG. 2 shows the sequence of steps in the method according to the present invention. Step 19 is the initialization step for all parameters used in the method, and will be detailed further.

The digitized communication, for example over link 3, is in the form of a series of binary samples (typically 8-bit samples) x(j), incoming at a rate (typically 8kHz) depending on the communication network bandwidth. A number N of successive of these samples x(j) are stored within appropriate computer system memory, so as to form a 20ms block i at step 20. Three parameters are associated with each block:

$S_i$ being determined equal to 1 only if a non stationary state of the input signal is being detected for current block i, $C_i$ being the sum of the M last states $S_i$ for the M last input blocks including the current block i, and $VP_i$ being a flag set to 1 according to the method of the invention only when voice presence is being decided in the digitized communication input signal, the voice presence decision being re-evaluated after each new incoming block i (the flag will be set to 0 when end of voice presence is being decided).

Figure 3:
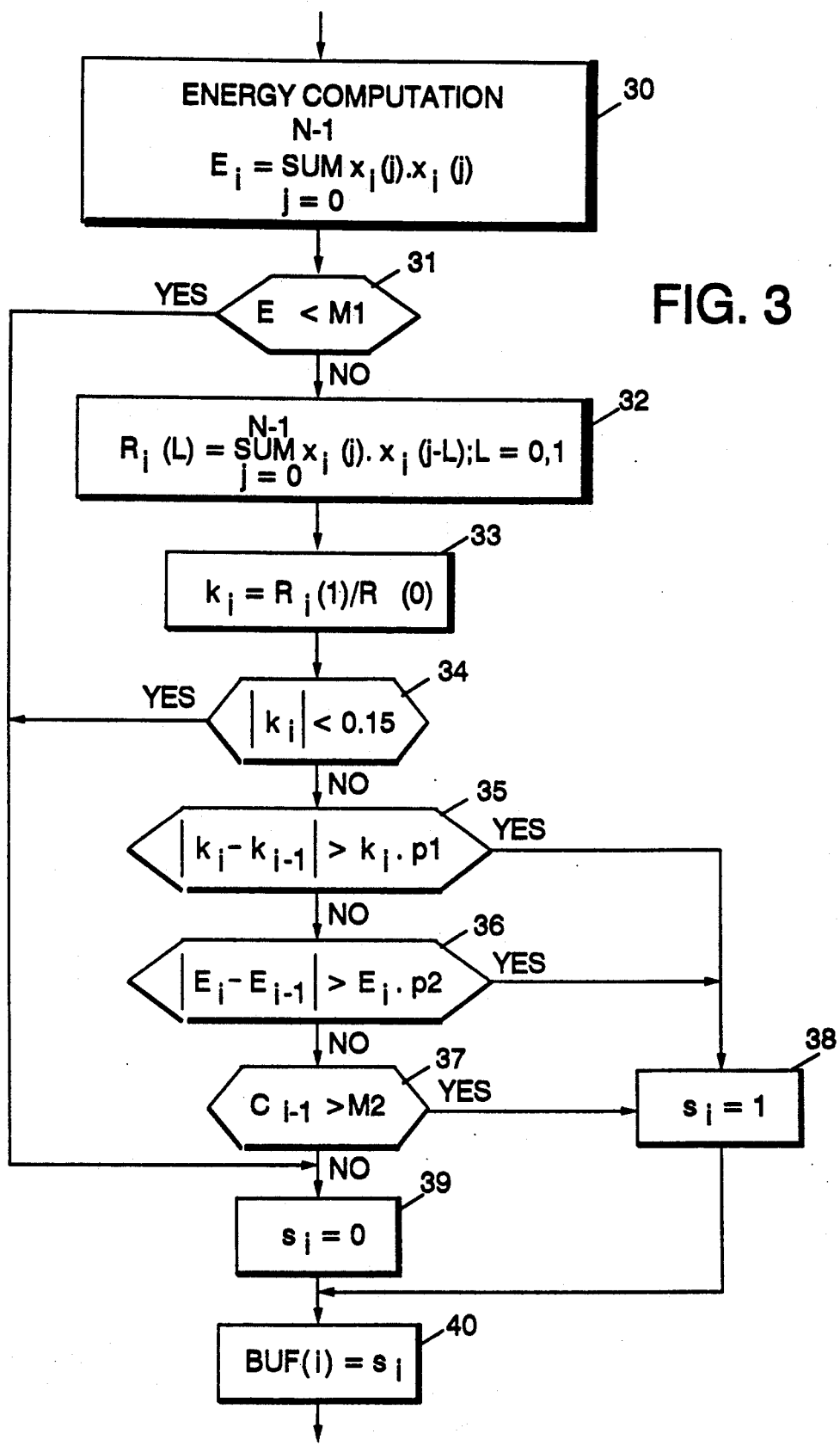
FIG. 3 shows the detailed sequence of steps included in step 21 in the method according to the present invention.

The state $S_i$ is determined for current block i at step 21, in a way that is for example detailed with FIG. 3 (other ways possible), and stored in a computer system buffer BUF(i).

Then, at step 22, the count $C_i$ is computed for current block i.

At step 23, a branch is made depending on whether or not the voice presence flag was activated after the last input block ($VP_{i-1}$), because the test on the value of $C_i$ differs according to the situation: if the voice presence flag was not activated, it is desirable that the voice presence decision (flag set to 1) be as soon as possible after the actual start of the called-party's answer, and at the same time, secure enough so as to not be made wrongly. Whereas if the voice presence flag was activated, there is 'no rush' to decide the end of the introductory message by the called-party.

Therefore, if $VP_{i-1}$ is equal to 0, $VP_i$ is set to 0 (no voice presence decision after current block i, step 26) if the sum $C_i$ is less than a value M3 (step 24), that is, less than M3 non stationary states are counted within the M last input blocks. Otherwise, $VP_i$ is set to 1 (voice presence decision after current block i, step 25).

If on the contrary, $VP_{i-1}$ is equal to 1, $VP_i$ is set to 0 (no voice presence decision after current block i, step 29) if the sum $C_i$ is equal to, 0 (step 27), that is, all M previous states are stationary ones. Otherwise, $VP_i$ is set to 1 (voice presence decision after current block i, step 28).

In both cases, the newly set $VP_i$ becomes the next $VP_{i-1}$ for the next analyzed input block, after a branch is made to step 20.

The re-evaluated VP flag can then be constantly polled by an application that requires accurate knowledge of beginning and end of voice on a communication line.

FIG. 3 shows the detailed sequence of steps included in step 21 in the method according to the present invention.

In step 30, the energy level Ei for a current input block is computed. Whether or not a dedicated mathematical processor is included in the computer system, the way to compute such an energy level is well-known to the man skilled in the art.

Then (step 31), the obtained value is compared with a M1 threshold, representing the specified level under which any signal on the link 3 is ignored. It is assumed that, under this level, there cannot be any voice presence in the current block, and a branch is made to step 39.

Otherwise, processing of the input signal is somewhat more elaborate: the first two autocorrelation coefficients for the current block, $R_i(0)$ and $R_i(1)$ are computed in step 32, as well as the ratio of the two in step 33, which gives a value $k_i$ (PARCOR for the current block i).

The test performed in step 34 is intended to differentiate voice from high level noise, and additionally from R1 tones (cadence as low as 50ms and frequency as high as 1600Hz). Both cases indeed might lead to erroneous voice presence decisions, if the fact is not exploited that, generally, the first PARCOR absolute value is much higher ($>0.15$) in the presence of voice than it is in the presence of noise signals. This test proves to be a good compromise between wrongly identifying high noise (or R1 tone) as voice, and accurately deciding voice presence in all cases. It can be removed if the system is to be attached to a network 4 featuring no R1 tones, or if the noise level remains within controllable limits, and a branch directly made from step 33 to step 35.

Next (step 35), the variation of $k_i$ versus its value for the preceding input block is computed, and compared with a fraction p1 of the current value: if the variation is higher, a non stationary state is decided for the current block (step 38). If not, a second test is performed (step 36).

The variation of energy level Ei versus its value for the preceding input block is computed, and compared with a fraction p2 of the current value: if the variation is higher, a non stationary state is decided for the current block (step 38). If not, a third test is performed (step 37).

When step 37 is reached, ambiguity should lie only in the presence of a tone, or a 'stationary' voiced speech. Ambiguity is removed by comparing the value of $C_{i-1}$ (number of non stationary states summed at the last input block), with a value M2 : if more than M2 non stationary states were counted, voiced speech is assumed and current block is decided non stationary (branch to step 38). Otherwise, a stationary block is assumed (branch to step 39).

Values for parameters that have proven to be effective are the following:

M=10
M1=−43 (dbm)
M2=5
M3=7
N=160
p1=2%
p2=25%

Those values are set at initialization step 19 along with setting of starting values for all other parameters.

It will be obvious to the man skilled in the art, that other values could be considered depending on the computer system and communication environment.

It will be equally obvious to the man skilled in the art that blocks of duration other than 20ms could have been chosen, shorter or longer (not exceeding 30 or 40ms though due to the type of signal analysis performed), the value of parameter N having to be adjusted accordingly.

FIG. 4 shows an example of parameter evolution with the method according to the present invention. A simulated $S_i$ state is shown on the first line, determined for each new incoming block. Second line shows the computed $C_i$ after each input block, and the third line the flag $VP_i$ indicating a decision of voice presence (flag is equal to 1) or end of voice presence (flag is equal to 0).

Although the invention has been described in a particular embodiment, it will be obvious to the man skilled in the art, that the description is sufficient to allow easy embodiment of the invention in other computer system and communication environment.

We claim:

1. A method for detecting voice presence on a communication line, in a system where communication data are incoming in the form of a series of successive binary samples, of which N are stored so as to successively make up an input block of samples, said method being characterized in that it comprises, after each input block, the steps of:
   determining the stationary or non stationary state of the current said input block,
   deciding voice presence in the incoming communication data if more than M3 non stationary states have been determined within the last M said input blocks including the current block, where M3 and M are arbitrarily selected parameter values
   deciding end of voice presence if no non stationary states have been determined within the said last M said input blocks, including the current said input block;
   wherein said step of deciding voice presence includes setting a Voice Presence flag to 1 if
   the Voice Presence flag has been set to 1 at the previous said input block, and at least one non stationary state has been determined within M said input blocks preceding and including the current said input block, or
   The Voice Presence flag has been set to 0 at the previous input block, but the number of non stationary determined states exceeds M3, and
   the step of deciding end of voice presence includes setting a Voice Presence flag to 0 if
   the Voice Presence flag has been set to 1 at the previous said input block and stationary states only have been determined within M said input blocks preceding and including the current said input block, or
   the Voice Presence flag has been set to 0 at the previous said input block, but the number of non stationary determined states is less or equal than M3; and wherein the step of determining the stationary or non stationary state of the current said input block i includes the steps of
   computing current signal energy for the current said input block,
   if said current signal energy is lower than a threshold M1, determining the current said input block to be stationary, where M1 is an arbitrarily selected parameter, otherwise computing the current PARCOR coefficient for the current said input block
   if the absolute value of the difference between said current PARCOR coefficient and the said PARCOR coefficient computed at the preceding said input block is lower than a fraction p1, which p1 is an arbitrarily selected parameter, of said current PARCOR coefficient, and if the absolute value of the difference between said current signal energy and the signal energy computed at the preceding said input block is lower than a fraction p2, which p2 is an arbitrarily selected parameter, of said current signal energy, and the number of non stationary determined states within M said input blocks preceding but not including the current said input block is lower than M2, which is an arbitrarily selected parameter, determining the current said input block to be stationary, otherwise determining the current said input block to be non stationary.

2. The method according to claim 1, characterized in that it also includes the step of determining the current said input block to be stationary if the absolute value of said current PARCOR coefficient is lower than 0.15.

3. The method according to claim 1, or, characterized in that aid binary samples are incoming at a rate of 8kHz, N is equal to 160, M3 is equal to 7, and M is equal to 10.

4. The method according to claim 1 or claim 2, characterized in that M'is equal to $-43$dbm, p1 is equal to 2%, p2 is equal to 25%, and M2 is equal to 5.

* * * * *